United States Patent
Yetukuri et al.

(10) Patent No.: US 7,441,821 B2
(45) Date of Patent: Oct. 28, 2008

(54) SYSTEM AND METHOD FOR ACTUATION OF A HEAD RESTRAINT

(75) Inventors: Nagarjun Yetukuri, Rochester Hills, MI (US); Gerald Locke, Lake Orion, MI (US); Sai Prasad Jammalamadaka, Novi, MI (US)

(73) Assignee: Lear Corporation, Southfield, MI (US)

( * ) Notice: Subject to any disclaimer, the term of this patent is extended or adjusted under 35 U.S.C. 154(b) by 339 days.

(21) Appl. No.: 11/164,384

(22) Filed: Nov. 21, 2005

(65) Prior Publication Data

US 2007/0114822 A1    May 24, 2007

(51) Int. Cl.
    *B60N 2/48* (2006.01)
(52) U.S. Cl. .................. 296/63; 296/1.11; 297/410; 297/408
(58) Field of Classification Search .......... 296/63–69, 296/1.11; 297/408, 410
    See application file for complete search history.

(56) References Cited

U.S. PATENT DOCUMENTS

| | | | |
|---|---|---|---|
| 2,985,229 A | | 5/1961 | Shamblin |
| 3,420,572 A | | 1/1969 | Bisland |
| 4,645,233 A | | 2/1987 | Bruse et al. |
| 4,711,494 A | | 12/1987 | Duvenkamp |
| 4,807,934 A | | 2/1989 | Sakakibara et al. |
| 4,977,973 A | | 12/1990 | Takizawa |
| 5,003,240 A | * | 3/1991 | Ikeda ............... 318/603 |
| 5,006,771 A | | 4/1991 | Ogasawara |
| 5,066,771 A | * | 11/1991 | Hino et al. .......... 528/353 |
| 5,288,129 A | * | 2/1994 | Nemoto ............. 297/410 |
| 5,590,933 A | | 1/1997 | Andersson |
| 6,074,011 A | * | 6/2000 | Ptak et al. .......... 297/408 |
| 6,088,640 A | * | 7/2000 | Breed ................ 701/45 |
| 6,614,579 B2 | * | 9/2003 | Roberts et al. ........ 359/267 |
| 6,824,212 B2 | * | 11/2004 | Malsch et al. ....... 297/216.12 |
| 6,910,740 B2 | | 6/2005 | Baker et al. |
| 7,196,836 B2 | * | 3/2007 | Bauer et al. ......... 359/265 |
| 7,232,187 B1 | * | 6/2007 | Sundararajan et al. ... 297/410 |
| 2005/0270620 A1 | * | 12/2005 | Bauer et al. ......... 359/265 |

FOREIGN PATENT DOCUMENTS

| | | |
|---|---|---|
| DE | 3440525 A1 | 5/1986 |
| DE | 3638261 A1 | 6/1987 |
| DE | 4433601 C1 | 4/1996 |
| EP | 1 138 548 A1 | 10/2001 |
| GB | 2 424 827 A | 10/2006 |
| WO | 01/38135 A1 | 5/2001 |
| WO | 2005/075241 A1 | 8/2005 |

OTHER PUBLICATIONS

Search Report, dated Mar. 16, 2007, 2 pages.

* cited by examiner

*Primary Examiner*—Dennis H Pedder
(74) *Attorney, Agent, or Firm*—Brooks Kushman P.C.

(57) ABSTRACT

A system and method for remote actuation of a vehicle head restraint includes an actuator arrangement configured to effect movement of a head restraint from a raised position to a lowered position. A sensor defines a first area, and is configured to output signals to the actuator arrangement to facilitate movement of the head restraint from its raised position to its lowered position when an object comes within a predetermined distance of the first area. The sensor is disposed proximate a rearview mirror in the vehicle such that a vehicle operator can simultaneously view the head restraint in the mirror and the first area.

15 Claims, 2 Drawing Sheets

SYSTEM AND METHOD FOR ACTUATION OF A HEAD RESTRAINT

BACKGROUND OF THE INVENTION

1. Field of the Invention

The present invention relates to a system and method for actuation of a head restraint.

2. Background Art

In many vehicles today, head restraints are provided not just for the front row passengers, but are also provided for passengers sitting in second and third row seats. When a second or third row seat is unoccupied, it may be desirable to have the associated head restraint folded down, or otherwise lowered, to reduce obstructions to the driver's view through the rear window. Passengers in a third row of seats may also prefer to have one or more head restraints in the second row lowered to improve their forward view.

Previous attempts at providing folding head restraints require either manual actuation of the head restraint—which precludes the driver from folding down the head restraint while operating the vehicle—or remote actuation of all of the head restraints in the rear seats. This may be inconvenient, particularly if one or more of the rear seats is occupied. In addition, the remotely located switch used to actuate the rear head restraints may not be located in a convenient position. For example, if such a switch is located on the vehicle dashboard, the driver may look in the rearview mirror, determine that at least one of the rear head restraints needs to be lowered, and then seek the switch on the dashboard to actuate the head restraints. Such a system is somewhat self-defeating, since the goal is to improve rearward visibility, and yet the system requires that the driver look forward at the dashboard to find the actuating switch.

Therefore, it would be desirable to have a system and method for remote head restraint actuation, where the actuating sensors are visible to the driver while the driver is looking in the rearview mirror. In addition, it would also be desirable to have a system and method for remote head restraint actuation that allows for selective, independent actuation of individual head restraints.

SUMMARY OF THE INVENTION

The present invention provides a system and method for remote head restraint actuation wherein individual head restraints can be selectively, independently actuated as desired.

The invention also provides a system and method for remote head restraint actuation that includes individual sensors to actuate each head restraint, wherein each of the sensors are visible to the vehicle driver while the driver is looking in the rearview mirror.

The invention further provides a system for remote actuation of at least one vehicle head restraint movable from a respective raised position to a respective lowered position. The vehicle includes a rearview mirror, and the system includes a first head restraint and a first actuator arrangement. The first actuator arrangement is configured to effect movement of the first head restraint from its raised position to its lowered position. A first sensor defines a first area, and is configured to output signals to the first actuator arrangement to facilitate movement of the first head restraint from its raised position to its lowered position when an object comes within a predetermined distance of the first area. The first sensor is disposed proximate the mirror such that a vehicle operator can simultaneously view the first head restraint in the mirror and the first area.

The invention also provides a system for remote actuation of a plurality of vehicle head restraints which are movable from a respective raised position to a respective lowered position. The vehicle includes a rearview mirror, and the system includes a plurality of head restraints visible in the mirror to a vehicle operator. Each of a plurality of actuator arrangements is configured to effect movement of a respective head restraint from its raised position to its lowered position. A plurality of sensors is configured to be independently actuated by the vehicle operator. Each of the sensors is associated with a respective head restraint such that actuation of any one of the sensors effects actuation of a respective actuator arrangement. This facilitates movement of a respective head restraint from its raised position to its lowered position independently from the movement of any of the other head restraints. Each of the sensors defines a respective sensor area, and is disposed proximate the mirror such that the vehicle operator can simultaneously view the head restraints in the mirror and the sensor areas.

The invention further provides a method for remote actuation of at least one vehicle head restraint from a respective raised position to a respective lowered position. The vehicle includes a sensor and an actuator arrangement for each of the at least one head restraints to facilitate movement of a respective head restraint from its raised position to its lowered position. The vehicle further includes a rearview mirror, and the method includes viewing an image of a first head restraint at a first location in the mirror. An object is disposed within a predetermined distance of the first location to actuate a first one of the sensors. This sends a signal from the first sensor to a first one of the actuator arrangements to effect movement of the first head restraint from its raised position to its lowered position.

DETAILED DESCRIPTION OF THE PREFERRED EMBODIMENT(S)

Figure 1:
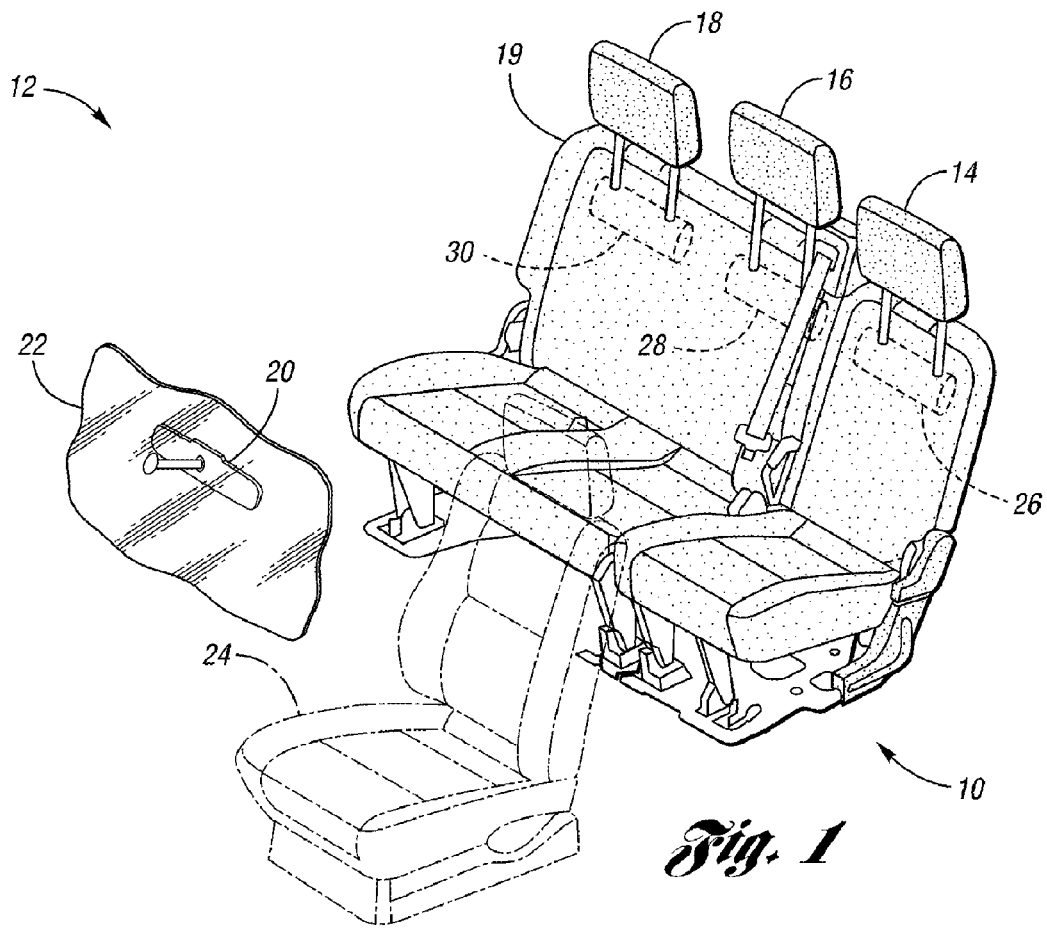
FIG. 1 is a perspective view of a system in accordance with one embodiment of the present invention, including a second row of vehicle seats having a plurality of head restraints.

FIG. 1 shows a vehicle 10 and a system 12 in accordance with one embodiment of the present invention. The system 12 includes a plurality of head restraints 14, 16, 18, associated with a second row of seats 19 in the vehicle 10. Although the terms "head restraint" and "head rest" may have technically different meanings within the automotive industry, it is understood that the term "head restraints" as used herein and throughout is intended to include either or both of these devices. Each of the head restraints 14, 16, 18 can be seen by a vehicle operator looking in a rearview mirror 20. In FIG. 1, the rearview mirror 20 is shown attached to a portion of the windshield 22. Also, shown in phantom, is a driver's seat 24.

Figure 2:
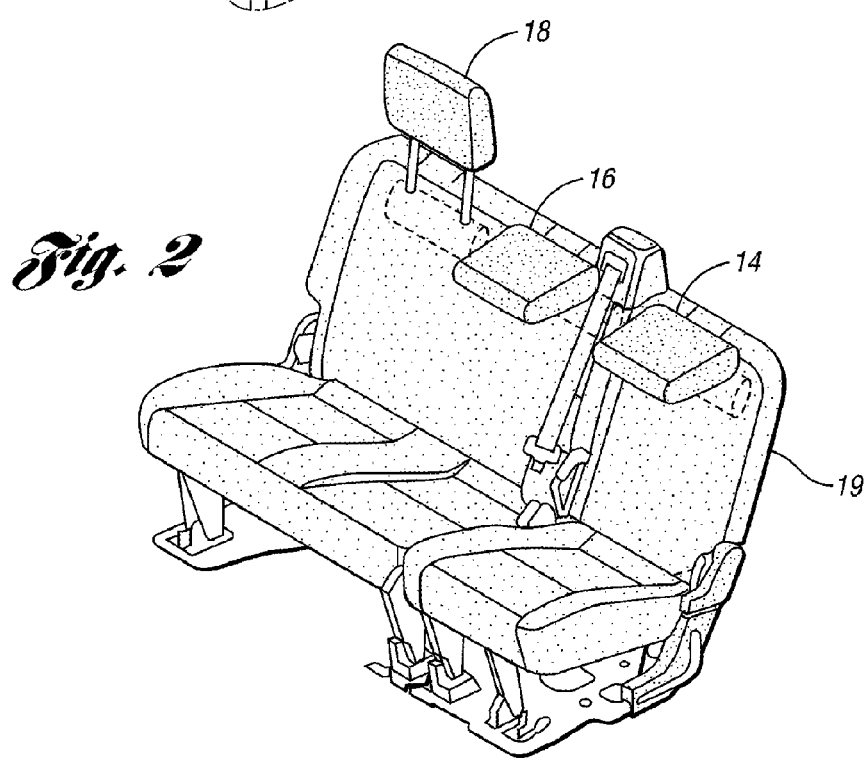
FIG. 2 is a perspective view of the seats shown in FIG. 1, having two of three head restraints folded down to a lowered position.

Each of the head restraints 14, 16, 18 has a respective actuator arrangement 26, 28, 30 associated with it. The actuator arrangements 26, 28, 30 may contain one or more motors, solenoids, gears, springs, cables and the like, effective to move its respective head restraint 14, 16, 18 from a raised position, as shown in FIG. 1, to a lowered position, as shown in FIG. 2 and described below. One type of actuator arrangement effective to move a head restraint, like the head restraints 14, 16, 18, from a raised position to a lowered position, is described in U.S. Pat. No. 5,590,933 issued to Andersson on Jan. 7, 1997, which is hereby incorporated herein by reference.

As shown in FIG. 2, the first and second head restraints, 14, 16 are in a folded down, or lowered position. Conversely, the third head restraint 18 still remains in its raised position. The present invention contemplates individual actuation of each of the head restraints 14, 16, 18, although embodiments of the present invention may lower all rear head restraints, or other groups of head restraints, simultaneously. In addition to providing remote actuation of head restraints in a second row of seats, such as the head restraints 14, 16, 18 in the second row of seats 19, embodiments of the present invention may provide for actuation of head restraints in a third row of seats (not shown). In some vehicles, a front passenger seat may also have a head restraint visible in the rearview mirror to a vehicle operator. In such a case, the present invention can be configured to also provide for remote actuation of a head restraint in the front passenger seat.

When the head restraints 14, 16, 18 are in their respective lowered position, they are folded forward toward the front of the vehicle 10, rather than rearward. This provides a safety feature in that a subsequent occupant of the second row of seats 19 will either have a head restraint in its upright use position, like the head restraint 18, or the head restraint will be folded forward, making it difficult to occupy the seat. In this case, the passenger will need to manually return the head restraint to its raised position, prior to occupying the seat. In this way, it can be ensured that the head restraint will be available if it is needed.

Figure 3:
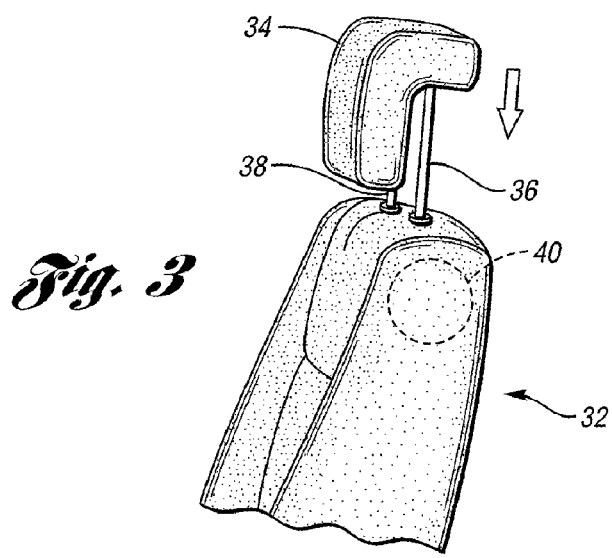
FIG. 3 is a perspective view of a portion of a vehicle seat having an alternatively configured head restraint.

Conversely, if a head restraint is folded rearward, it may be inadvertently left in this position, and therefore not in an upright, use position when the seat is subsequently occupied. Of course, a head restraint need not be folded forward to be placed in a lowered position, and yet, may still be available for use. For example, FIG. 3 shows a portion of a vehicle seat 32 including a head restraint 34. The head restraint 34 is vertically movable on rods 36, 38 and may be moved to a lowered position as indicated by the directional arrow. In such a case, the driver's view may be freed from obstruction, while the head restraint 34 nonetheless remains available to a subsequent occupier of the seat 32. As with the head restraints 14, 16, 18, the head restraint 34 can be moved to its lowered position by an actuator arrangement 40.

Figure 4:
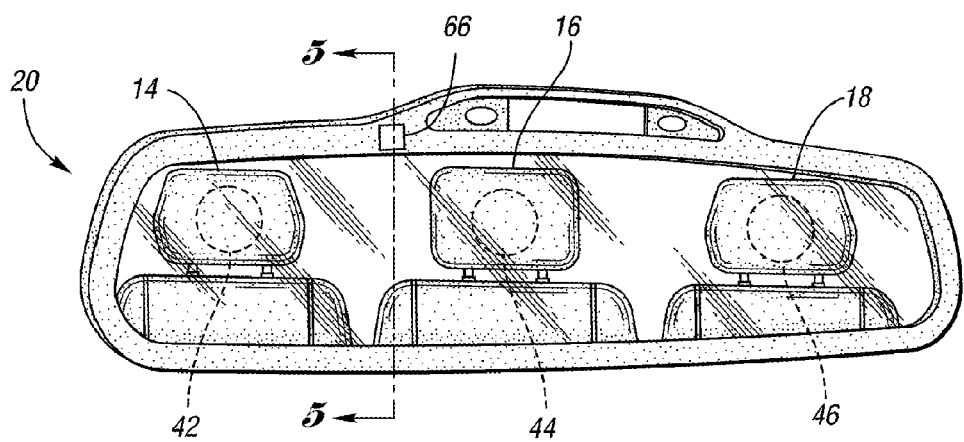
FIG. 4 is a perspective view of the vehicle rearview mirror shown in FIG. 1, including images of the head restraints reflected therein.
Figure 5:
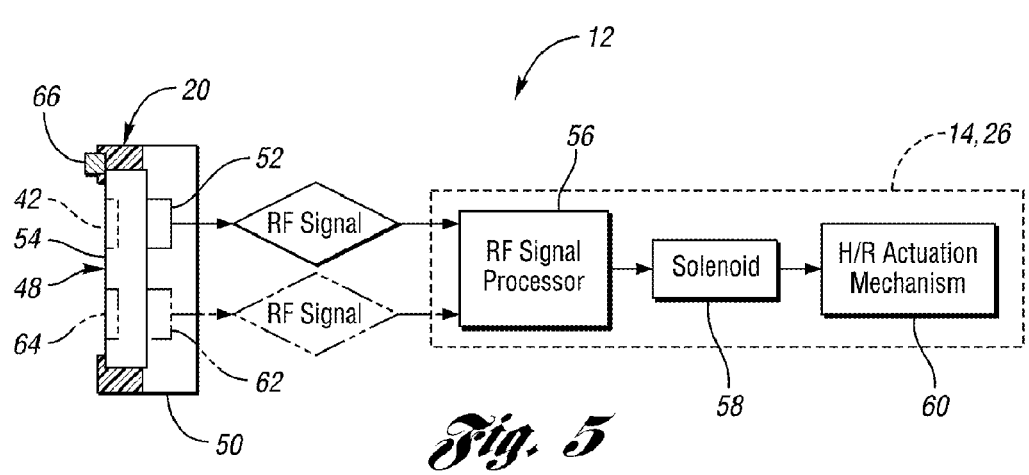
FIG. 5 is a partially schematic representation of the system shown in FIG. 1.

Turning to FIG. 4, the mirror 20 is shown with a visible image of the head restraints 14, 16, 18 reflected therein. For each of the head restraint images reflected in the mirror 20, there is a corresponding area, or head restraint location 42, 44, 46. The head restraint locations 42, 44, 46 are shown in dashed lines in FIG. 4, because they will not be visible to the vehicle operator. They are merely illustrated in FIG. 4 to indicate a location, and in particular a location associated with a respective sensor that facilitates movement of a respective one of the head restraints 14, 16, 18 from its raised position to its lowered position. For example, FIG. 5 shows a cross-sectional view of the mirror 20 taken through line 5-5 shown in FIG. 4. The area, or head restraint location 42, is indicated by the dashed line shown in the glass 48 of the mirror 20.

The glass 48 is held by a frame 50 which also surrounds a first sensor 52. The sensor 52 is a capacitance-type field effect sensor well known to those in the relevant art. The sensor 52 defines the head restraint location 42, which is an area mapped to the location of the image of the head restraint 14 shown in the mirror 20. The area 42 is used to actuate the sensor 52 to facilitate movement of the head restraint 14 to its lowered position. Although a capacitance-type sensor is shown and described here for illustrative purposes, it is understood that other types of contact or non-contact sensors could be used, including resistive or inductive switches, magnetic sensors, or Hall Effect devices. Where a push button contact switch or switches are used, the "area", such as the area 42, could be the face or front surface of the push button.

The sensor 52 can be configured to change the size of the area 42 which can be used to actuate the sensor 52. For example, depending on the circuitry used in the sensor 52, one or more resistors can be changed to increase or decrease the size of the area 42. To actuate the sensor 52, it is only necessary to bring an electrically conductive object—such as a finger—within a predetermined distance of the head restraint location 42. It is worth noting that this predetermined distance can be positive or negative. That is, the sensor 52 can be configured such that the presence of a finger or other object within a few millimeters of a front surface 54 of the mirror glass 48 will actuate the sensor 52. Conversely, the sensor 52 can be configured such that an object must touch, or even deflect the surface 54 inward in order to actuate the sensor 52.

Once an electrically conductive object is brought within the predetermined distance of the surface 54 within the area 42, the sensor 52 is actuated. As shown in FIG. 5, the sensor 52 is configured for wireless communication with the head restraint 14. In other embodiments, sensors, such as the sensor 52, can communicate with a respective head restraint via a wired system. In the embodiment shown in FIG. 5, the sensor 52 outputs a radio frequency (RF) signal which communicates with an RF signal processor 56. It is understood that other forms of wireless communication may also be used. The RF signal processor 56 then communicates with a solenoid 58 which effects movement of a head restraint actuation mechanism 60. This causes the head restraint 14 to be moved from its raised position—as shown in FIG. 1—to its lowered position—as shown in FIG. 2.

As shown in FIG. 5, the RF signal processor 56, the solenoid 58, and the head restraint actuation mechanism 60 are grouped together and are associated with the head restraint 14 and the actuator mechanism 26. This grouping is for illustrative purposes only, and does not necessarily reflect how an actuator arrangement, such as the actuator arrangement 26, will be configured. For example, the solenoid 58 and the head restraint actuation mechanism 60, may make up, or be part of, the actuator arrangement 26, as shown in FIG. 1. Further, although each head restraint and/or actuator arrangement may have its own signal processor, such as the signal processor 56, a single signal processor could be used to service more than one actuator arrangement and head restraint. A signal processor, such as the signal processor 56, can be disposed in virtually any convenient location throughout a vehicle—e.g., in a mirror, a dashboard, or even in a head restraint assembly, where it could nonetheless send signals to actuate other head restraints in the vehicle.

To illustrate, FIG. 5 shows in phantom a sensor 62 defining an area, or head restraint location 64, in the mirror 20. The sensor 62 could be configured to actuate a head restraint in a third row of seats (not shown) whose image in the mirror 20 would appear slightly below the image of the head restraints 14, 16, 18 from the second row of seats 19. As shown in FIG. 5, actuation of the sensor 62 by bringing an object within the predetermined distance from the head restraint location 64 would cause an RF signal to be output to the RF signals processor 56. The RF signal processor 56 can be configured to receive signals from more than one sensor, and then output signals of different frequencies to actuate the appropriate solenoid and/or other actuator arrangement device. Returning briefly to FIG. 4, it is readily understood that the head restraint locations 44, 46 will each have a sensor associated with them in defining their respective areas in the mirror 20. These sensors would be at approximately the same height as the sensor 52, shown in FIG. 5, and are not visible in this view.

Also shown in FIGS. 4 and 5 is a switch 66 disposed partially within the frame 50 of the mirror 20. Because the sensor 52, and the sensors associated with the other head restraints, may be capacitance-type sensors, it may be desirable to disable the remote actuation feature to allow, for example, the mirror 20 to be adjusted without inadvertently lowering one or more of the head restraints. Thus, the switch 66 can be configured with a first setting which facilitates actuation of sensors, such as the sensors 52 and 62, and it can also have a second setting to prohibit actuation of sensors, such as the sensors 52, 62. The switch 66 can also be configured such that it automatically returns to the second setting to prohibit actuation of the sensors 52, 62 after it has been in the first setting for some predetermined amount of time.

Although it may be convenient to provide sensors, such as the sensors 52, 62 within the frame 50 of the mirror 20, such sensors could be placed in other locations. For example, capacitance-type sensors, or other types of sensors, including switches, could be located within the frame 50 of the mirror 20, or in a location on an upper console or headliner of the vehicle. In such cases, the portions of the sensors that a vehicle operator would actuate—e.g., the area 42 for the sensor 52—would be visible to the vehicle operator simultaneously with the reflected image of the head restraints in the mirror 20. In this way, the vehicle operator does not need to take his or her eyes off of the rearview mirror 20 to search for a button or other actuating mechanism on a dashboard or lower console. Even the switch 66 is conveniently located in the frame 50 of the mirror 20, so that the vehicle operator can actuate it while still looking in the mirror 20. In other embodiments of the present invention, a switch, such as the switch 66, may be located in other parts of the vehicle, for example, in a steering wheel.

The system 12 illustrated in the drawing figures and described above, facilitates the use of a method of remote actuation of a head restraint in accordance with the present invention. With reference to the elements of the drawing figures, a vehicle operator would view an image of a head restraint, such as the head restraint 14, in the rearview mirror 20. In order to facilitate movement of the head restraint 14 to its lowered position—see FIG. 2—the vehicle operator would then place an object, such as his or her finger, within a predetermined distance of the area 42 on the mirror 20—see FIG. 4. This would cause the head restraint 14 to be moved to its lowered position. If this did not increase visibility enough, the vehicle operator could then similarly actuate a sensor to lower the head restraint 16 and/or the head restraint 18. As discussed above, it may be necessary for the vehicle operator to place the switch 66 into a first setting prior to actuating the desired sensors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remote actuation of at least one vehicle head restraint movable from a respective raised position to a respective lowered position, the vehicle including a rearview mirror, the system comprising:
   a first head restraint;
   a first actuator arrangement configured to effect movement of the first head restraint from its raised position to its lowered position; and
   a first sensor defining a first area and configured to output signals to the first actuator arrangement to facilitate movement of the first head restraint from its raised position to its lowered position when an object comes within a predetermined distance of the first area, the first sensor being disposed proximate the mirror such that a vehicle operator can simultaneously view the first head restraint in the mirror and the first area, the first area being mapped to a location on the mirror where the first head restraint is visible to the vehical operator.

2. The system of claim 1, further comprising:
   a second head restraint;
   a second actuator arrangement configured to effect movement of the second head restraint from its raised position to its lowered position; and
   a second sensor defining a second area and configured to output signals to the second actuator arrangement to facilitate movement of the second head restraint from its raised position to its lowered position when an object comes within a predetermined distance of the second area, the second sensor being disposed proximate the mirror such that the vehicle operator can simultaneously view the first and second head restraints in the mirror and the first and second areas.

3. The system of claim 2, wherein the first and second sensors are configured to be actuated independently of each other, thereby facilitating independent movement of the first and second head restraints from their respective raised positions to their respective lowered positions.

4. The system of claim 2, wherein the first and second areas correspond to predetermined head restraint locations on the mirror such that a respective sensor can be actuated to facilitate movement of a respective head restraint when an object comes within a predetermined distance of a respective head restraint location on the mirror.

5. The system of claim 4, wherein the first and second sensors are capacitive sensors configured to be actuated when a vehicle operator's finger comes within the predetermined distance of a respective head restraint location on the mirror.

6. The system of claim 4, further comprising a switch having a first setting for facilitating actuation of the first and second sensors, and a second setting for prohibiting actuation of the first and second sensors.

7. The system of claim 6, wherein the switch is disposed proximate the mirror such that the vehicle operator can simultaneously view the first and second head restraints in the mirror, the first and second areas, and the switch.

8. A system for remote actuation of a plurality of vehicle head restraints movable from a respective raised position to a respective lowered position, the vehicle including a rearview mirror, the system comprising:
   a plurality of head restraints visible in the mirror to a vehicle operator;

a plurality of actuator arrangements, each of the actuator arrangements being configured to effect movement of a respective head restraint from its raised position to its lowered position; and a plurality of sensors configured to be independently actuated by the vehicle operator, each of the sensors being associated with a respective head restraint such that actuation of any one of the sensors effects actuation of a respective actuator arrangement, thereby facilitating movement of a respective head restraint from its raised position to its lowered position independently from the movement of any of the other head restraints, each of the sensors defining a respective sensor area and being disposed proximate the mirror such that the vehicle operator can simultaneously view the head restraints in the mirror and the sensor areas, each of the sensor areas being mapped to respective head restraint location on the mirrow where a respective head restraint is visible to the vehicle operator.

9. The system of claim 8, wherein each of the sensors is further configured for wireless communication with a respective actuator arrangement.

10. The system of claim 8, wherein each of the sensors is further configured to be actuated when an object comes within a predetermined distance of a respective sensor area.

11. The system of claim 10, wherein each of the sensor areas is disposed on a portion of the mirror.

12. The system of claim 11, further comprising a switch having a first setting for facilitating actuation of the sensors, and a second setting for prohibiting actuation of the sensors.

13. The system of claim 12, wherein the switch is disposed proximate the mirror such that the vehicle operator can simultaneously view the head restraints in the mirror and the switch.

14. The system of claim 8, wherein there are at least three head restraints and three respective head restraint locations visible in the mirror to the vehicle operator.

15. The system of claim 10, wherein the predetermined distance is a positive distance.

* * * * *